US012614854B2

(12) United States Patent
Mizrahi et al.

(10) Patent No.: US 12,614,854 B2
(45) Date of Patent: Apr. 28, 2026

(54) END-FIRE TAPERED SLOT ANTENNA

(71) Applicant: Elta Systems Ltd., Ashdod (IL)

(72) Inventors: Yaniv Mizrahi, Modi'in (IL); Reuven Bauer, Rehovot (IL); Gregory Lukovsky, Givat-Shmuel (IL)

(73) Assignee: Elta Systems Ltd., Ashdod (IL)

( * ) Notice: Subject to any disclaimer, the term of this patent is extended or adjusted under 35 U.S.C. 154(b) by 173 days.

(21) Appl. No.: 18/253,356

(22) PCT Filed: Nov. 17, 2021

(86) PCT No.: PCT/IL2021/051363
§ 371 (c)(1),
(2) Date: May 17, 2023

(87) PCT Pub. No.: WO2022/113064
PCT Pub. Date: Jun. 2, 2022

(65) Prior Publication Data

US 2023/0420858 A1 Dec. 28, 2023

(30) Foreign Application Priority Data

Nov. 26, 2020 (IL) .......................................... 279008

(51) Int. Cl.
*H01Q 13/08* (2006.01)
*H01Q 21/06* (2006.01)

(52) U.S. Cl.
CPC ......... *H01Q 13/085* (2013.01); *H01Q 21/064* (2013.01)

(58) Field of Classification Search
CPC ... H01Q 13/085; H01Q 21/064; H01Q 21/067
See application file for complete search history.

(56) References Cited

U.S. PATENT DOCUMENTS 5,428,364 A * 6/1995 Lee ........................ H01Q 13/08 343/770
9,000,996 B2 * 4/2015 Holland ............... H01Q 21/064 343/702

(Continued)

FOREIGN PATENT DOCUMENTS

WO WO-2018022308 A2 * 2/2018 ............... H01Q 1/38

OTHER PUBLICATIONS

Lee , et al., "Slotline Impedance", IEEE Transactions on Microwave Theory and Techniques, vol. 39, No. 4, Apr. 1991, pp. 666-672.

*Primary Examiner* — Seokjin Kim
(74) *Attorney, Agent, or Firm* — Ballard Spahr LLP

(57) ABSTRACT

An end-fire tapered slot antenna is described. The antenna includes a conductive ground plane having a pass-through opening recessed therein, and a dual tapered slot element (DTSE) passing through the pass-through opening. The DTSE includes a substrate, a radiating portion including a first and second pairs of radiating wings symmetrically arranged on the opposite sides of the substrate, and a base portion electrically coupled to the radiating portion and including first and second pairs of the legs passing through the pass-through opening of the conductive ground plane. The legs inner edges define a slot line on each side of the substrate having a tapered shape with increasing a distance between the inner edges. Vias elements are arranged along an entire perimeter of the radiating wings electrically connecting the radiating wings and the legs arranged on the opposite sides of the substrate. Electrical shunts are located on each side of the substrate for connecting the radiating wings of the DTSE to the conductive ground plane.

25 Claims, 4 Drawing Sheets

(56) References Cited

U.S. PATENT DOCUMENTS

| | | | | |
|---|---|---|---|---|
| 2002/0180655 | A1* | 12/2002 | Mohuchy | H01Q 21/064 343/770 |
| 2007/0126637 | A1* | 6/2007 | Habib | H01Q 5/50 343/700 MS |
| 2008/0211726 | A1 | 9/2008 | Elsallal et al. | |
| 2011/0057852 | A1* | 3/2011 | Holland | H01Q 13/085 343/810 |
| 2015/0035707 | A1* | 2/2015 | Tankielun | H01Q 17/001 343/703 |
| 2019/0252787 | A1* | 8/2019 | McGrath | H01Q 1/50 |
| 2019/0312355 | A1* | 10/2019 | Brigham | H01Q 13/106 |
| 2022/0200159 | A1* | 6/2022 | Abdelrahman | H01Q 9/285 |

* cited by examiner

END-FIRE TAPERED SLOT ANTENNA

TECHNOLOGICAL FIELD

The present invention relates generally to wideband antenna systems, and in particular, to an end-fire tapered slot antenna for use as an antenna element in phased array systems.

BACKGROUND

Phased array antenna systems include a plurality of electro-magnetic radiating antenna elements. The use of an end-fire tapered slot antenna element, often called a notch or Vivaldi element for wide-band arrays, is known in the art. These types of antennas are widely used in many array applications since they provide a wide transmission bandwidth, a relatively small size, design simplicity, and easy adaptation to an antenna array.

Another example of such an end-fire tapered slot antenna is the so-called "Bunny Ear Antenna" (BEA). A BEA generally includes two wing-shaped conductors separated by a gap between them and a balanced feedline, such as a coaxial cable or a microstrip line coupled to the wing-shaped conductors. The wing-shaped conductors have tapered inner and outer edges typically characterized by an exponential behavior (function).

One way of constructing the BEA is by tapering the outside edges of the two conductors of a Vivaldi antenna element. The outer shielding of the coaxial cable can be attached to one wing-shaped conductor, while the center conductor of the coaxial line can be attached to another wing-shaped conductor. In operation, electromagnetic signals are delivered from a power source to the input balanced feedline via the coaxial cable. As the electromagnetic signal passes across the gap between the two wing-shaped conductors of the BEA, an electromagnetic wave is generated and transmitted into the atmosphere.

In order to maximize radiation efficiency and minimize energy reflection, the impedance of the balanced feedline, the gap between the two conductors and the conductors, must be matched.

U.S. Pat. No. 5,428,364 describes a radiating element which includes an input mechanism for receiving electromagnetic energy from a source and a balanced feeding mechanism extending from the input mechanism for transmitting the electromagnetic energy and for providing impedance matching over a range of frequencies. The radiating element also includes a dipole mechanism extending from the balanced feeding mechanism radiating the electromagnetic energy. The radiating element also includes an input mounting block which is connected to the two opposing sides of a planar dielectric substrate. A balanced narrow conductor slot line extends from the input mounting block on both sides of the dielectric substrate to transmit the electromagnetic energy and to provide impedance matching over a frequency range of (0.5 to 18) GHz. The narrow conductor slot line is tapered to match the radiation resistance of a dipole element utilized to radiate the electromagnetic energy. The dipole element extends from the balanced narrow conductor slot line on both sides of the dielectric substrate with each wing having an expanded width for accommodating surface current of various distributions over the frequency range. The dipole element also includes an inner taper for radiating energy over the frequency range with the position of the dipole element relative to a ground plane being optimized to minimize radiation reflection.

U.S. Pat. No. 9,000,996 describes a modular wideband antenna element for connection to a feed network. The antenna has a ground plane, and first and second flared fins above the ground plane. Each fin defines a connection location that is relatively close to the ground plane and tapering to a free end located farther from the ground plane. The connection location of the first fin is electrically coupled to the feed network and the connection location of the second fin is electrically coupled to the ground plane.

U.S. Pat. Publication No. 2015/0035707 describes an antenna which has two antenna elements forming a planar slot-line antenna. The antenna also includes absorber elements surrounding the antenna elements on two layers. The absorber elements are shaped to partially cover the antenna elements.

GENERAL DESCRIPTION

Despite the wide use of end-fire tapered slot antennas, the elements of this type of antenna have several disadvantages when employed in phased arrays. One of these disadvantages is the high cross-polarization appearing when the radiated beam is steered to wide scan angles. This occurs due to extensive surface currents flowing in the longitudinal direction along the tapered slots of the antenna elements in a phased array system. These surface currents can also generate undesired propagation modes causing a high reflected energy, and a "scan-blindness," thus disabling the phased array systems, which are based on the end-fire tapered slot antennas, from scanning in wide angles, thereby reducing the transmission efficiency of the phased array systems.

Thus, it would be useful to have an antenna element, which, when employed in a phased array, can reduce high cross-polarization and suppress undesired propagation modes (causing scan blindness), and thereby to enable scanning in wide angles, while providing high transmission efficiency of the phased array system.

The present invention partially eliminates disadvantages of the prior art antenna techniques and provides a novel end-fire tapered slot antenna, which can be used as an antenna element in phased array systems.

According to an embodiment of the present invention, the end-fire tapered slot antenna is a end-fire tapered slot antenna that includes a conductive ground plane. The conductive ground plane can include a pass-through opening recessed therein. The pass-through opening has a predetermined dimension and shape. The end-fire tapered slot antenna also includes a dual tapered slot element (DTSE). The DTSE passes through the pass-through opening which is recessed in the conductive ground plane.

According to an embodiment, the DTSE includes a substrate which has two surfaces located on opposite sides of the substrate. The substrate is made of a nonconductive material.

According to an embodiment, the DTSE has a radiating portion and a base portion. The radiating portion includes a first pair of radiating wings symmetrically arranged on a surface of one side of the substrate, and a second pair of radiating wings symmetrically arranged on a surface of another side of the substrate, opposite to the first pair of radiating wings.

According to an embodiment, the radiating wings on both sides of the substrate have flared inner edges, flared lower edges, and outer edges orthogonal to the conductive ground plane.

According to an embodiment, the base portion of the DTSE is electrically coupled to the radiating portion. The base portion includes a first pair of legs arranged on the surface located on one side of the substrate symmetrically with respect to a symmetry axis orthogonal to the conductive ground plane. The base portion also includes a second pair of legs symmetrically arranged on the surface of the other side of the substrate, opposite to the first pair of legs.

The first and second pairs of the legs pass through the pass-through opening of the conductive ground plane. The first and second pairs of the legs are coupled to a feed line at a downmost part of the base portion. It should be noted, that the term "downmost" is used herein to refer to the most distal end of the base portion.

The legs of the first and second pairs of the legs have inner edges. The inner edges of the first and second pairs of the legs define a corresponding slot line therebetween on the surface of each side of the substrate along the symmetry axis orthogonal to the conductive ground plane. The legs have also bottom edges and outer edges. The outer edges of the legs flare in an exponential manner.

According to an embodiment, the slot line on the surface of each side of the substrate has a tapered shape and extends from a downmost part of the base portion towards the radiating portion. A distance between the inner edges of the legs within the slot line on each side of the substrate gradually increases, in accordance with a predetermined relationship.

According to an embodiment, the DTSE further includes a plurality of vias elements. The vias elements can be arranged in a spaced-apart relationship at the inner edges of the legs, the flared inner edges, the flared lower edges, and at the outer edges of the radiating wings along an entire perimeter of the radiating wings. The vias elements are configured to electrically connect the radiating wings and legs arranged on the surfaces of the opposite sides of the substrate.

According to an embodiment, the DTSE further includes at least one pair of electrical shunts arranged on the surface of each side of the substrate. The electrical shunts are configured to connect the radiating wings of the DTSE to the conductive ground plane.

According to an embodiment, the substrate has a predetermined dielectric constant, which can be in the range of 2 to 20 and a predetermined thickness which can be in the range of $0.135\lambda_0$ to $0.3\lambda_0$, where $\lambda_0$ is a free-space operating wavelength of the end-fire tapered slot antenna.

According to an embodiment, the shape of the pass-through opening can be circular, and have a predetermined diameter that can be in the range of $0.1\lambda_0$ to $0.2\lambda_0$, however other shapes of the pass-through opening are also contemplated.

According to an embodiment, the flared inner edges and the flared lower edges of the radiating wings flare in an exponential manner. The flared inner edges of the radiating wings define a radiating gap on each side of the substrate. The radiating gap on each side of the substrate extends from the downmost part of the radiating portion to the distal uppermost part of the radiating portion, correspondingly. It should be noted that the term "uppermost" is used herein to refer to the most distal end of the radiating portion.

According to an embodiment, the radiating gaps on each side of the substrate progressively widen in an exponential manner from the downmost part towards the distal uppermost part, correspondingly. The radiating gaps are configured to provide an impedance matching between the end-fire tapered slot antenna and a wave impedance in a free-space.

According to an embodiment, a height of the radiating wings has a predetermined length in the range of $0.35\lambda_0$ to $0.5\lambda_0$, where $\lambda_0$ is a free-space operating wavelength of the end-fire tapered slot antenna.

According to an embodiment, a height of the legs has a predetermined length in the range of $0.15\lambda_0$ to $0.25\lambda_0$.

According to an embodiment, the conductive ground plane is disposed at a certain distance D from the radiation portion, and the distance L can be in the range of $0.025\lambda_0$ to $0.05\lambda_0$.

According to an embodiment, the corresponding slot line on each side of the substrate at the downmost part of the base portion has a distance Do between the inner edges of the legs suitable to match an impedance of the slot line with an input impedance of the feed line.

According to an embodiment, the predetermined relationship describing the gradual increasing of the distance between the inner edge of each of the legs and the symmetry axis is $D=ax+D_0$, where a is the taper slope of the inner edges along the symmetry axis), x is a coordinate along the symmetry axis and $D_0$ is the distance between the inner edges of the first and second pair of legs and the symmetry axis at the downmost part of the base portion.

The taper slope a characterizes a rate of widening of the slot line. The taper slope depends on the dielectric constant ε and on the thickness s of the substrate. In other words, the rate a is a function $a=f(\varepsilon, s)$ of the dielectric constant ε and the thickness s. Accordingly, the dielectric constant ε and the predetermined thickness s of the substrate can be selected in advance by the manufacturer to provide optimal performance of the end-fire tapered slot antenna, as shown hereinbelow.

According to an embodiment, each pair of electrical shunts located on each side of the substrate may connect any two points selected on the flared lower edges of the symmetrical wings (symmetrical with respect to the symmetry axis) to any two corresponding points selected on the ground plane.

According to an embodiment, the feed line is coupled to the based portion of the DTSE on one of the sides of the substrate. The feed line includes a coaxial cable coupled to the pair of legs mounted on the surface of one of the sides of the substrate. Specifically, the coaxial cable includes a shield conductor connected to one of the legs and a core conductor connected to the other leg.

According to an embodiment, the plurality of vias elements are arranged at a predetermined distance d from the inner edges of the legs. Likewise, the vias elements are arranged at the flared inner edges, the flared lower edges, and the outer edges of radiating wings along the entire perimeter of the radiating wings.

According to an embodiment, the distance d is in the range of $0.01\lambda_o$ to $0.15\lambda_o$.

According to one general aspect of the present invention, there is provided a phased array system including a plurality of the end-fire tapered slot antennas of the present invention.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
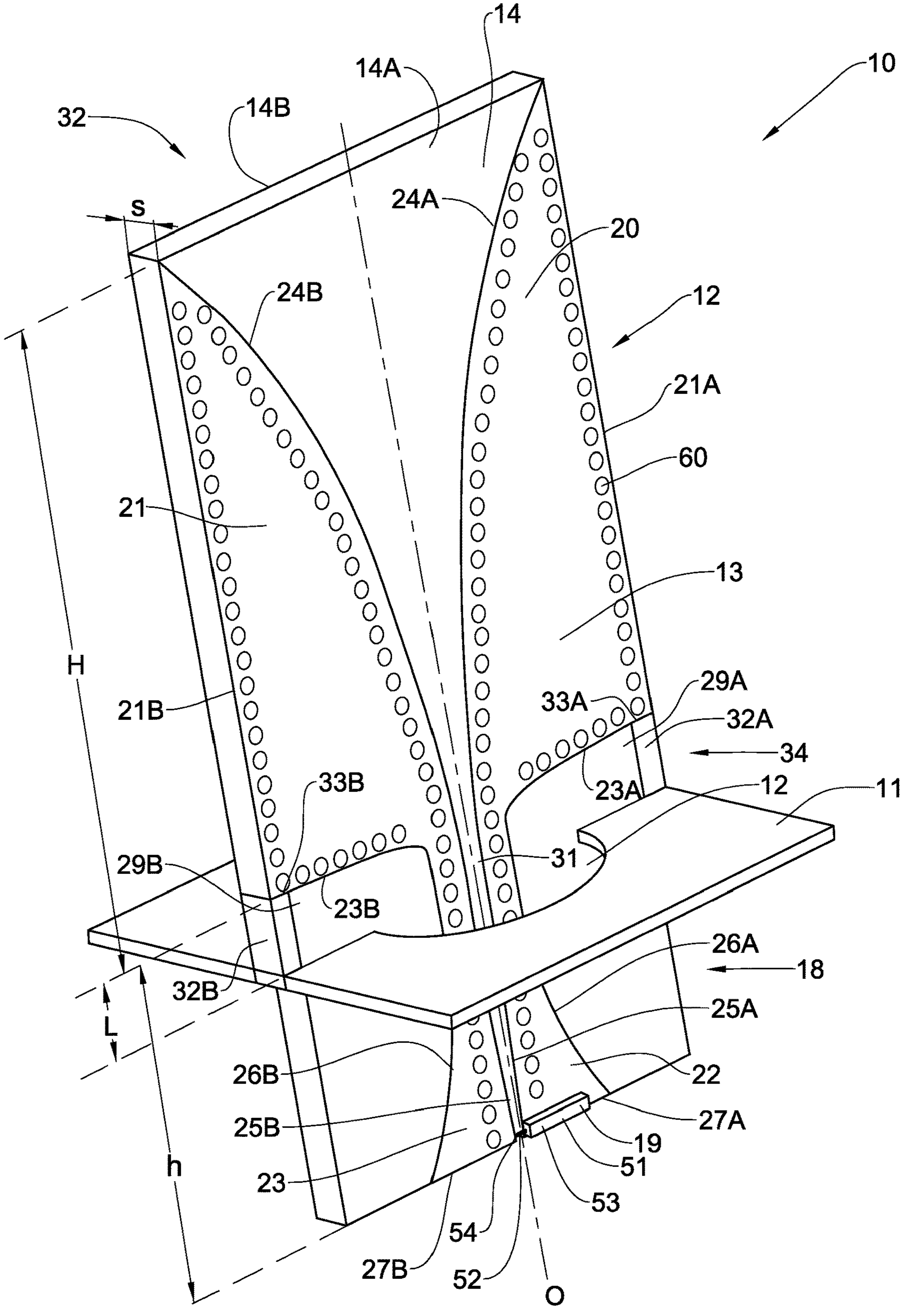
FIG. 1 illustrates a schematic perspective view of a end-fire tapered slot antenna, according to an embodiment of the present invention.

The principles and operation of an end-fire tapered slot antenna element and the phase array assembled from these antenna elements according to the present invention may be better understood with reference to the drawings and the accompanying description, it being understood that these drawings are given for illustrative purposes only and are not meant to be limiting. The same reference numerals and alphabetic characters will be utilized for identifying those components which are common in the antenna structure and its components shown in the drawings throughout the present description of the invention.

Referring to FIG. 1, a schematic perspective view of an end-fire tapered slot antenna is illustrated, according to an embodiment of the present invention. It should be noted that this figure is not to scale, and is not in proportion, for purposes of clarity.

According an embodiment, the end-fire tapered slot antenna 10 includes a substrate 14 having two surfaces 14A and 14B on opposite sides of the substrate 14 (only the side of the surface 14A is seen in FIG. 1). The substrate 14 is made of a nonconductive material having a predetermined dielectric constant ε and a predetermined thickness s. The predetermined thickness s can be in the range of $0.01\lambda_o$ to $1.0\lambda_o$, where $\lambda_0$ is a free-space operating wavelength of the end-fire tapered slot antenna 10. Examples of the nonconductive material suitable for the substrate 14 include, but are not limited to, Teflon (e.g., Duroid provided by Rogers Cie), Epoxy (e.g., FR4), etc. In some embodiments, the dielectric constant ε of the nonconductive material can be in the range of 2 to 20.

FIG. 1 shows only a part of the end-fire tapered slot antenna 10, namely the part which is mounted on the surface 14A of the substrate 14. However, the second part of the end-fire tapered slot antenna 10 (which is located on the surface 14B of the opposite side of the substrate 14) is identical to the part mounted on the surface 14A, as described hereinbelow.

The end-fire tapered slot antenna 10 also includes a conductive ground plane 11 having a predetermined width, which can, for example, be in the range of $0.1\lambda_o$ to $0.2\lambda_o$. The conductive ground plane 11 includes a pass-through opening 12 recessed therein. According to an embodiment, the pass-through opening 12 is a circular pass-through opening having a predetermined diameter, however pass-through openings having other shapes, such as oval, polygonal etc., are also contemplated. For example, the predetermined width of the conductive ground plane 11 can be in the range of $0.1\lambda_o$ to $0.2\lambda_o$ and the predetermined diameter of the circular pass-through opening 12 can be in the range of $0.1\lambda_0$ to $0.2\lambda_0$. The conductive ground plane 11 is formed from a sheet of electrically conductive material and can, for example, be made of aluminium to provide a lightweight structure. Alternatively, other materials, e.g., zinc plated steel, can be used for the conductive ground plane 11.

The end-fire tapered slot antenna 10 also includes a dual tapered slot element (DTSE) 13. The DTSE 13 passes through the pass-through opening 12 recessed in the conductive ground plane 11 orthogonally to the ground plane 11.

According to an embodiment, the DTSE 13 is electrically coupled to the ground plane 11 via electrical shunts, as is described hereinbelow.

The DTSE 13 includes a radiating portion 17, a base portion 18 electrically coupled to the radiating portion 17 and a feed line 19 coupled to the base portion. The radiating portion 17 includes a first pair of radiating wings 20 and 21 arranged on the surface 14A of one side of the substrate 14, and a similar second pair of radiating wings (not shown) oppositely arranged on the opposite surface 14B of the other side of the substrate 14. The first pair of radiating wings 20 and 21 is symmetrically arranged on the surface 14A with respect to the symmetry axis O (i.e. the radiating wings are symmetrical with respect to the symmetry axis O). Likewise, the second pair of radiating wings is similarly arranged on the other opposite surface 14B of the substrate 14.

According to an embodiment, the radiating wings on the surfaces 14A and 14B of the opposite sides of the substrate 14 have a predetermined length H. The length H can, for example, be in the range of $0.35\lambda_0$ to $0.65\lambda_0$, where $\lambda_0$ is the free-space operating wavelength of the end-fire tapered slot antenna 10.

The radiating wings 20 and 21 include corresponding outer edges 21A and 21B, flared lower edges 23A and 23B, and flared inner edges 24A and 24B. The outer edges 21A and 21B are orthogonal to the conductive ground plane 11. The flared lower edges 23A and 23B and the flared inner edge 24A and 24B flare away in an exponential manner. The second pair of radiating wings arranged on the other side of the substrate 14 have corresponding edges similar to the edges of the first pair of the radiating wings 20 and 21.

The flared inner edges 24A and 24B of the first pair of radiating wings 20 and 21 and the flared inner edges of the second pair of the radiating wings (not shown) define a corresponding radiating gap 30 on each side of the substrate 14. As shown in FIG. 1, In particular, the flared inner edges 24A and 24B of the first pair of the radiating wings 20 and 21 which are located on the surface 14A define a radiating gap 30 between the flared inner edges 24A and 24B. The inner tapered edges of the second pair of the radiating wings located on the surface 14B of the opposite side of the substrate 14 define a radiating gap (not shown) between these flared inner edges, similar to the radiating gap 30 formed by the first pair of the radiating wings.

The radiating gaps 30 arranged on each side of the substrate 14 (i.e., the radiating gaps on the surfaces 14A 14B) extend from a downmost part 31 of the radiating portion 17 to a distal uppermost part 32 of the radiating portion 17. It should be noted, that the term "downmost" is used herein to refer to the most distal end of the base portion 18. In turn, the term "uppermost" is used herein to refer to the most distal end of the radiating portion 17.

The radiation gap 30 progressively widens from the downmost part 31 towards the distal uppermost part 32, in accordance with the flare of the flared inner edges 24A and 24B of the radiating wings 20 and 21 located on the surface 14A. Accordingly, the radiating gap on the other side of the substrate 14 (on the surface 14B) progressively widens similarly to the radiating gap 30 formed on the surface 14A. In particular, the radiating gap on the surface 14B progressively widens from the downmost part 31 of the radiating portion 17 towards the distal uppermost part 32 of the radiating portion 17, in accordance with the flare of the flared inner edges of the second pair of the radiating wings (not shown) located on the surface 14B of the other side substrate 14. It should be noted that, when desired, the lower tapered edges and the inner tapered edges of the radiating wings located on the surfaces 14A and 14B of the substrate 14 can flare in accordance with different forms of flaring.

It should be noted that the exponential widening of the radiating gap 30 on each side of the substrate 14 provides suitable impedance matching between the end-fire tapered slot antenna 10 and the wave impedance of free-space (approximately 377 Ohms). Accordingly, the radiating gap on each side of the substrate 14 serves as a transmission channel enabling propagation of electromagnetic waves from the radiating portion 17 into the atmosphere.

According to an embodiment, the conductive ground plane 11 is disposed at a certain distance L from the radiation portion 17. Such a distance L can, for example, be in the range of $0.025\lambda_0$ to $0.05\lambda_0$. When required, the radiating portion 17 can be mechanically supported by supporters on the ground plane 14. As shown in FIG. 1, the supporters 29A and 29B are constituted by portions of the substrate 14 on a right and left side of the substrate 14. According to an embodiment, the conductive ground plane 11 is perpendicular to radiating portion 17, i.e. it is perpendicular to the symmetry axis O.

The base portion 18 is electrically coupled to the radiating portion 17. As shown in FIG. 1, the base portion 18 is an extension of the radiating portion 17, i.e. the base portion 18 and the radiating portion 17 are integrated as a single unit. As also shown in FIG. 1, the base portion 18 passes through the pass-through opening 12 of the conductive ground plane 11.

The base portion 18 includes a first pair of legs 22 and 23 symmetrically arranged on the surface 14A of one side of the substrate 14 and a second similar pair of legs (not shown) arranged on the surface 14B of the opposite side of the substrate 14. The legs 22 and 23 which are located on the surface 14A of the substrate 14 are symmetrical to each other with respect to the symmetry axis O.

Similarly, to the legs 22 and 23, the second pair of legs located on the surface 14B of the opposite side of the substrate 14 are symmetrical to each other with respect to the symmetry axis O. The first pair of legs 22 and 23 and the second pair of legs pass through the pass-through opening 12 of the conductive ground plane 11. The legs on both surfaces 14A and 14B of the substrate 14 have a predetermined length h, which can, for example, be in the range of $0.08\lambda_0$ to $0.25\lambda_0$.

The first pair of legs 22 and 23 include corresponding inner edges 25A and 25B, outer edges 26A and 26B, and bottom edges 27A and 27B. The outer edges 26A and 26B flare in an exponential manner. The inner edges 25A and 25B flare in accordance with a predetermined relationship as described hereinbelow. Likewise, the second pair of legs (not shown) located on the surface 14B of the opposite side of the substrate 14 have corresponding edges similar to the edges of the first pair of the legs 22 and 23.

The inner edges 25A and 25B of the legs 22 and 23 on one side of the substrate 14 and the inner edges of the legs (not shown) located on the other side of the substrate 14 define a corresponding slot line on each side of the substrate 14. As can be seen in FIG. 1, the inner edges 25A and 25B of the first pair of legs 22 and 23 define a corresponding slot line 31 between the legs 22 and 23 along the symmetry axis O. The inner edges of the second pair of legs (not shown) which are located on the surface 14B of the substrate 14 define a corresponding slot line (not shown) between the second pair of legs along the symmetry axis O, similar to the slot line 31. The slot lines (i.e., the slot line on each side of the substrate 14) extend from a downmost part 28 of the base portion 18 towards the Radiating portion 17. The slot lines have a tapered shape such that the slot lines progressively widen from the downmost part 28 of the base portion 18 towards the radiating portion 17, in accordance with a predetermined relationship. Accordingly, in the slot line 31 a distance D between the inner edges 25A and 25B of the legs 22 and 23 and the symmetry axis O gradually increases. Likewise, in the slot line on the other side (surface 14B) of the substrate 14 the distance D between the inner edges of the second pair of legs also increases in accordance with this predetermined relationship.

According to an embodiment, the predetermined relationship of the widening of the slot line on each side of the substrate 14, i.e., the distance D between the inner edges of the legs and the symmetry axis O on each side of the substrate 14 gradually increases in accordance with the empirical equation $D=ax+D_0$, where a is the a taper slope of the inner edges of the legs along the symmetry axis O. This taper slope characterizes a rate of widening of the slot line on each side of the substrate 14. The variable x is a coordinate along the symmetry axis O and $D_0$ is the distance between the inner edges of the legs and the symmetry axis O on each side of the substrate 14 at the downmost part 28 of the base portion 18. In particular, $D_0$ is the distance between the inner edges 25A and 25B of the legs 22 and 23 and the symmetry axis O and the distance between the inner edges of the legs (not shown) located on the other side of the substrate 14 and the symmetry axis O. In this equation, the variable x varies from the downmost part 28 of the base portion 18 towards the radiating portion 17. Accordingly, such a predetermined relationship characterizes the profile of the slot line on each side of the substrate 14, i.e., the slot line 31 located on surface 14A and the corresponding slot line on the opposite surface 14B of the substrate 14.

In the present description, the terms "rate of widening", "taper slope" and "slope of tapering" refer to the slope a of the equation $D=ax+D_0$ and are used herein interchangeably.

It was found by the inventors that the taper slope a depends on a dielectric constant s and on a thickness s of the substrate 14. The dielectric constant ε and the thickness s of the substrate 14 can be selected to provide optimal performance of the end-fire tapered slot antenna 10 as shown hereinbelow. In other words, the taper slope a is a function $a=f(\varepsilon, s)$ of the dielectric constant ε and the thickness s of the substrate.

For example, when ε=9.2 and s=0.024$\lambda_0$, the taper slope is a=0.07 and, accordingly, the predetermined relationship is D=0.035x+0.003$\lambda_0$.

According to an embodiment, the slot line on each side of the substrate 14 at the downmost part 28 of the base portion 18 is such as to match the impedance of the slot line on each side of the substrate 14 with the input impedance of the feed line 19 (approximately 50 Ohms). As the slot line on each side of the substrate 14 widens from the downmost part 28 of the base portion 18 towards the radiating portion 17, the impedance gradually increases along the slot line on each side of the substrate 14 and continues to increase along the radiating gap on each side of the substrate 14 as to match with the wave impedance in free-space (approximately 377 Ohms).

There is a wide choice of materials available which are suitable for the end-fire tapered slot antenna 10. The first pair of legs 22 and 23, the second pair of legs, the first pair of radiating wings 20 and 21 and the second pair of radiating wings can, for example, be etched on the substrate 14, or made by any other known technique from a layer of conductive material. This layer of the conductive material is selected to be rather thin, such that a layer thickness t is much less than $\lambda_0$ ($t \ll \lambda_0$). Examples of such a conductive material include, but are not limited to, copper, gold and their alloys.

As mentioned above, the dual tapered slot element (DTSE) 13 is electrically connected to the conductive ground plane 11 via electrical shunts. As shown in FIG. 1, the end-fire tapered slot antenna 10 includes first and second electrical shunts 32A and 32B for electrically connecting the DTSE 13 to the conductive ground plane 11. The first and second electrical shunts 32A and 32B are arranged on the surface of the supporters 29A and 29B of the substrate 14, at the opposite sides of the radiating portion 17 symmetrically with respect to the symmetry axis O. More specifically, the first and second electrical shunts 32A and 32B are connected at two points 33A and 33B on the flared lower edges 23A and 23B of the wings, correspondingly. Although the two points 33A and 33B are shown in FIG. 1 at the opposite symmetrical ends of the flared lower edges 23A and 23B of the wings, generally, the first and second electrical shunts 32A and 32B can be configured for connecting any two points selected on the lower flared edges 23A and 23B to the ground plane 11. In other words, the invention is not bound by the location of the two points 33A and 33B. When required, the first electrical shunt 32A can connect any point selected on the flared lower edge 23A of the radiating wing 20 to any point selected upon the conductive ground plane 11. Accordingly, the electrical shunt 32B can connect any point selected on the flared lower edge 23B of the radiating wing 21 to any other point selected upon the conductive ground plane 11.

According to an embodiment, two additional electrical shunts (not shown) similar to the first and second electrical shunts 32A and 32B are located on the opposite surface of the supporters 29A and 29B of the substrate 14 and connect the wings to the conductive ground plane 11. These two additional electrical shunts are arranged on the opposite surface of the supporters 29A and 29B in a similar manner as the first and second electrical shunts 32A and 32B.

It should also be noted that, when required, more than one pair of electrical shunts on each surface of the substrate 14 can be used for coupling the DTSE 13 to the conductive ground plate 11. For example, two or more electrical shunts can be arranged at each side of the radiating portion 17 with respect to the axis O to connect four or more (an even number) of points selected within the radiating portion 17 to the corresponding number of points selected within the conductive ground plane 11.

The antenna of the present invention may be fed using any conventional manner, and in a manner compatible with the corresponding external electronic unit (transmitter or receiver) for which the antenna is employed.

According to the embodiment, the feed line 19 is coupled to the base portion 18 of the dual tapered slot element (DTSE) 13 on one side of the substrate 14, i.e., on one of the surfaces 14A or 14B of the substrate 14. As shown in FIG. 1, the feed line 19 is coupled to the base portion 18 on the surface 14A of the substrate 14.

The feed line 19 includes a coaxial cable having a shield conductor 51 coupled to one of the legs 22 or 23 and a core conductor 52 connected to the other leg. As shown in FIG. 1, the shield conductor 51 is coupled to the leg 22 at a feed point 53 on the lower edge 27A of the leg 22. The core conductor 52 is connected to the leg 23 at a connecting point 54 on the inner edge 25B of the leg 23. It should be understood that the feed point 53 and the connecting point 54 can also be at other locations.

It should also be understood that an external unit can be coupled to the end-fire tapered slot antenna 10 also magnetically, mutatis mutandis.

Mechanically, the external unit can be connected to the end-fire tapered slot antenna 10 by providing a connector (not shown) coupled to the feed line 19 and fastening the coaxial cable or any other transmission line between this connector and the external unit.

According to an embodiment, the DTSE 13 also includes a plurality of vias elements 60. The vias elements 60 can be configured for suppressing undesired propagation modes (resonances).

According to an embodiment, the plurality of vias elements 60 are arranged in a spaced-apart relationship on the radiating portion 17 and on the base portion 18. More specifically, the vias elements 60 on the radiating portion 17 are arranged in a proximity to the outer edges 21A and 21B, the flared lower edges 23A and 23B, and the flared inner edge 24A and 24B of the radiating wings 20 and 21, along an entire perimeter of the radiating wings 20 and 21.

According to an embodiment, the vias elements 60 on the base portion 18 are arranged on the inner edges 25A and 25B of the legs 22 and 23, correspondingly. The vias elements 60 are arranged on the legs 22 and 23 and on the radiating wings 20 and 21 at a predetermined distance d from the corresponding edges. Such a distance d can, for example, be in the range of 0.01$\lambda_o$ to 0.15$\lambda_o$.

The vias elements 60 pass through the substrate 14 from the surface 14A of one side of the substrate 14 to the opposite surface 14B on the other side of the substrate 14. The vias elements 60 electrically connect the first pair of the radiating wings 20 and 21 with the second pair of radiating wings, and electrically connect the first pair of the legs 22 and 23 with the second pair of the legs arranged on the opposite surfaces 14A and 14B of the substrate 14, correspondingly.

The vias elements 60 can, for example, be made in the form of pins and made from any conductive material, for example, copper, gold and their alloys.

It can be understood that a variety of manufacturing techniques can be employed to manufacture the end-fire tapered slot antenna 10.

For example, the conductive ground plane 11 can be cut from a solid sheet of a conductive material.

The dual tapered slot element (DTSE) 13 shown in FIG. 1 can, for example be manufactured by using any standard printed circuit techniques. Conductive layers overlying the surfaces 14A and 14B of the opposite sides of the substrate 14 can, for example, be etched to form the flared edges of the first pair legs 20 and 21, the flared edges the second pair of legs, the flared edges of the first pair of radiating wings 22 and 23, the flared edges of the second pair of radiating wings and the electrical shunts. Alternatively, deposition techniques can be employed to form the conductive layer/s. In such cases, the flared edges of the first pair legs 20 and 21, the flared edges the second pair of legs, the flared edges of the first pair of radiating wings 22 and 23, the flared edges of the second pair of radiating wings and the electrical shunts can be formed as layers of conductive material arranged on the surfaces 14A and 14B of the opposite sides of the substrate 14, correspondingly.

It can be appreciated by a person of the art that the end-fire tapered slot antenna of the present invention may have numerous applications. The list of applications includes, but is not limited to, various devices operating in narrow and/or broad bands within the frequency range of about 1 GHz to 3.5 GHz. The size of the antenna of the present invention can be in the order of millimeters to tens of centimeters, and the thickness in the order of millimeters to a few centimeters.

It should be noted that the single element antenna described above with reference to FIG. 1, can be implemented in an array structure of a linear or plane form, taking the characteristics of the corresponding array factor. Furthermore, when required, this array antenna can be monolithically co-integrated on-a-chip together with other elements (e.g. digital signal processing (DSP)-driven switches), and can also radiate steerable multi-beams, thus making the whole array a smart antenna.

FIGS. 2-6 illustrate exemplary simulation results depicting performance in the operational frequency range of 1 GHz to 3.5 GHz of a linear infinite phased array system built from a plurality of the antenna elements shown in FIG. 1 for various structural and material-related properties of the end-fire tapered slot antenna 10. In these specific non-limiting examples, the phased array system is configured for the operational frequency in the range of 1 GHz to 3.5 GHz.

As described above, the slope of the tapering a of the slot line on each side of the substrate (14 in FIG. 1) depends on dielectric constant ε and on thickness s of the substrate 14. In other words, the taper slope a is a function $a=f(\varepsilon, s)$ of the dielectric constant ε and the thickness s. To provide optimal performance of a phased array system, for an antenna element having a certain design, the dielectric constant ε and the thickness s of the substrate 14 can be selected to match the profile of the slot line on each side of the substrate of the antenna element. In particular, for the slot line on each side of the substrate having a predetermined taper slope a, the dielectric constant ε and the thickness s of the substrate 14 should be selected to have predetermined values, suitable to match the taper slope a. Alternatively, when the antenna element has a substrate having a certain dielectric constant and thickness, the taper slope a of the slot line can be calculated before manufacturing of the antenna element, to provide optimal performance of the phased array system.

Figure 2:
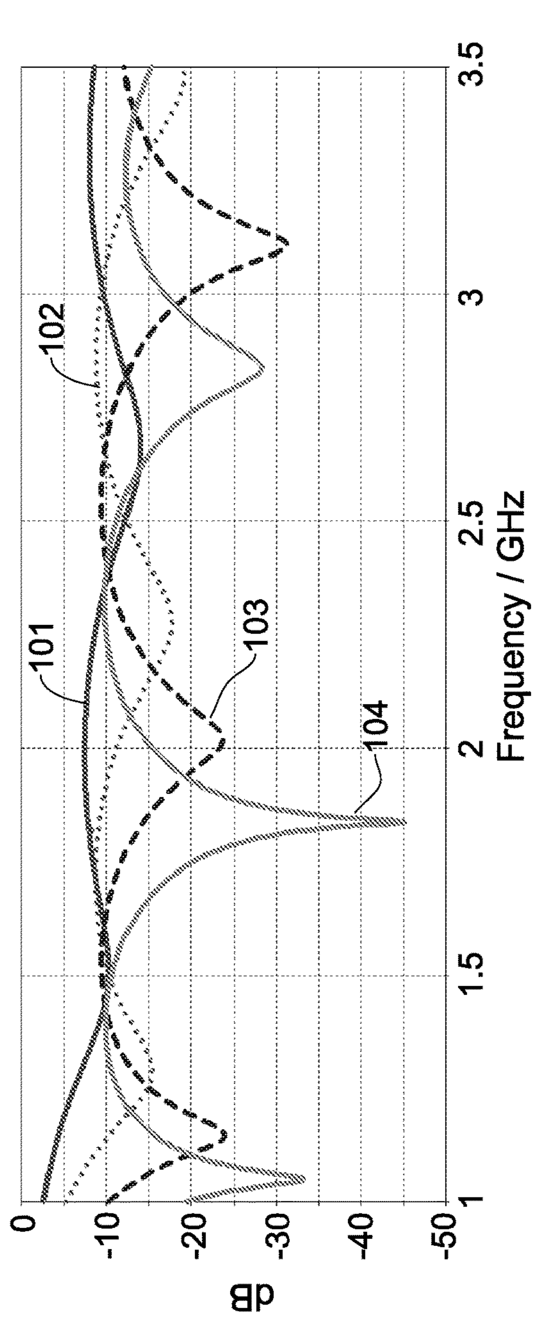
FIG. 2 illustrates an example of the frequency dependence of the return loss coefficient for a phased array system built from end-fire tapered slot antennas which utilize substrates differing in their dielectric constant.

In particular, FIG. 2 illustrates an example of a frequency dependence of the input reflection (return loss coefficient) for the phased array system built from the antenna elements that utilize substrates that differ in their dielectric constant ε. Curves 101, 102, 103 and 104 represent the return loss (affecting the phased array performance) of the phased array using substrates having dielectric constants of 3.2, 5.2, 7.2 and 9.2, correspondingly. In this example, the slot line (31 in FIG. 1) of the antenna elements in the phased array system have a profile characterized by a distance between the inner edges of the legs and the symmetry axis O described by the relationship $D=0.035x+0.003\lambda_0$, and by a thickness s of the substrate (14 in FIG. 1) of the antenna elements of $0.024\lambda_0$. As can be seen, the phased array system built from the antenna elements employing substrates having the dielectric constant ε=9.2 provides the optimal (i.e., minimal) return losses (see curve 104).

Figure 3:
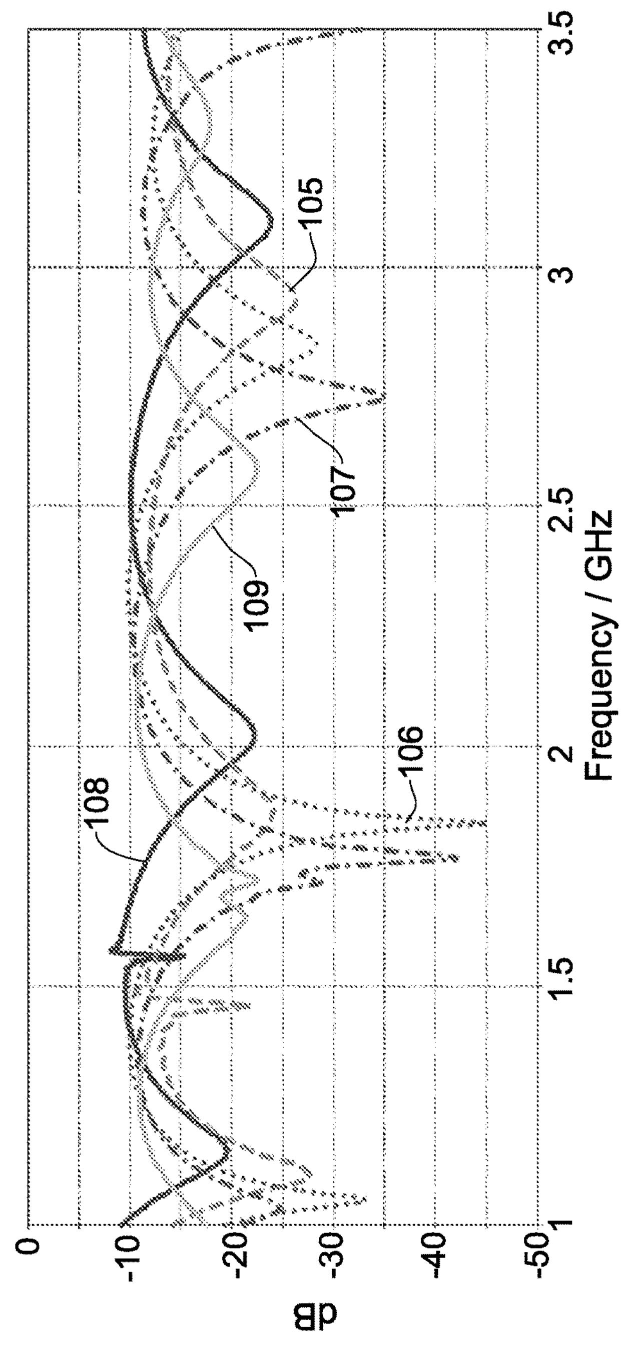
FIG. 3 illustrates an example of the frequency dependence of the return loss coefficient for a phased array system built from end-fire tapered slot antennas which utilize substrates differing in their thickness.

FIG. 3 illustrates an example of a frequency dependence of the return loss coefficient for the phased array system built from the antenna elements which utilize substrates differing in their thickness s. Curves 105, 106, 107, 108 and 109 represent the return loss coefficient of the phased array system employing substrates having thicknesses of $0.0225\lambda_0$, $0.024\lambda_0$, $0.0264\lambda_0$, $0.017\lambda_0$ and $0.032\lambda_0$, correspondingly. In this example, the antenna elements in the phased array system have the slot line (31 in FIG. 1) having a profile characterized by a distance between the inner edges of the legs described by the relationship $D=0.07x+0.0034$ and have substrates having the dielectric constant of ε=9.2. As can be seen in FIG. 3, the phase array system built from the antenna elements employing substrates having the thickness $s=0.024\lambda_0$ provides the optimal (minimal) return losses (see curve 106).

As can be seen from FIGS. 2 and 3, the dielectric constant and the thickness of the substrate affect the performance of the phased array system, that should be taken into account in construction and manufacturing of the phased array system.

Figure 4:
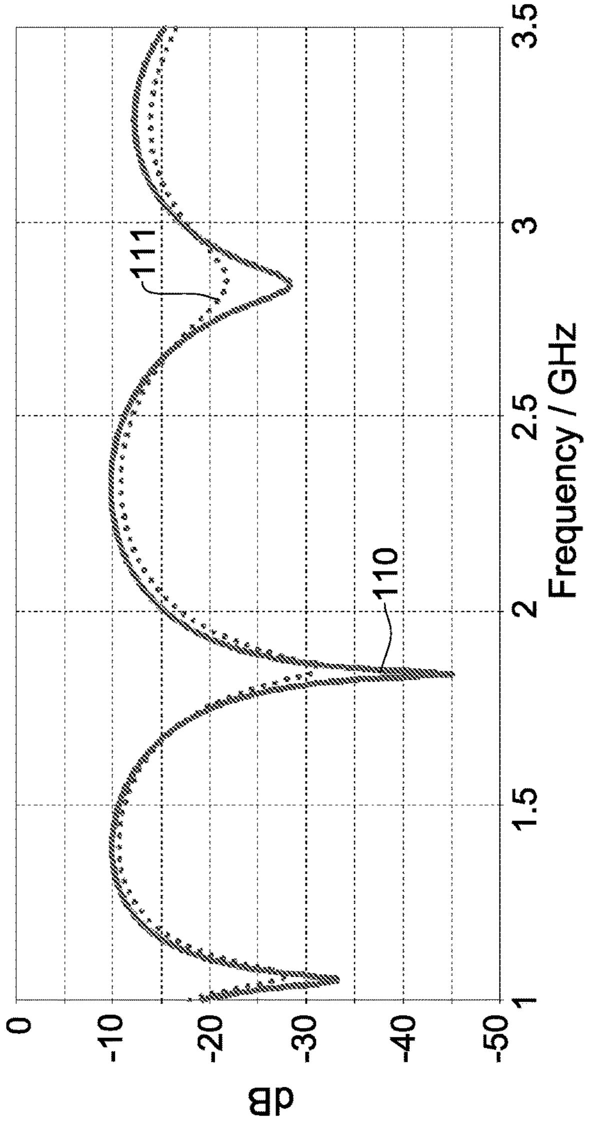
FIG. 4 illustrates an example of the frequency dependence of the return loss coefficient of the phased array system built from the end-fire tapered slot antennas having two different taper slopes of the slot line.

FIG. 4 illustrates exemplary frequency dependencies of the return loss coefficient of the phased array system built from the antenna elements having two different taper slopes of the slot line. In this example, the substrates in both phased array systems have the thickness $s=0.024\lambda_0$ and the dielectric constant ε=9.2. In particular, curve 110 describes the frequency dependencies of the return loss coefficient for the phased array system built from the antenna elements having a profile of the slot line characterized by a distance between the inner edges of the legs, which is described by the relationship $D=0.035x+0.003\lambda_0$. In turn, curve 111 describes the frequency dependency of the return loss coefficient for the phased array system built from the antenna elements having a profile of the slot line characterized by the distance between the inner edges of the legs, which is described by the relationship $D=0.0385x+0.003\lambda_0$. The taper slopes in these equations differ by 10%. As can be seen, the phased array system built from the antenna elements having the slope of tapering a=0.035 provides the optimal (i.e., minimal) return losses (see curve 110). Thus, for the phased array system built from the antenna elements employing substrates having the thickness $s=0.024\lambda_0$ and the dielectric constant ε=9.2, the slot line having a profile, characterized by a distance between the inner edges of the legs described by the relationship $D=0.035x+0.003\lambda_0$, provides the optimal return loss.

Figure 5:
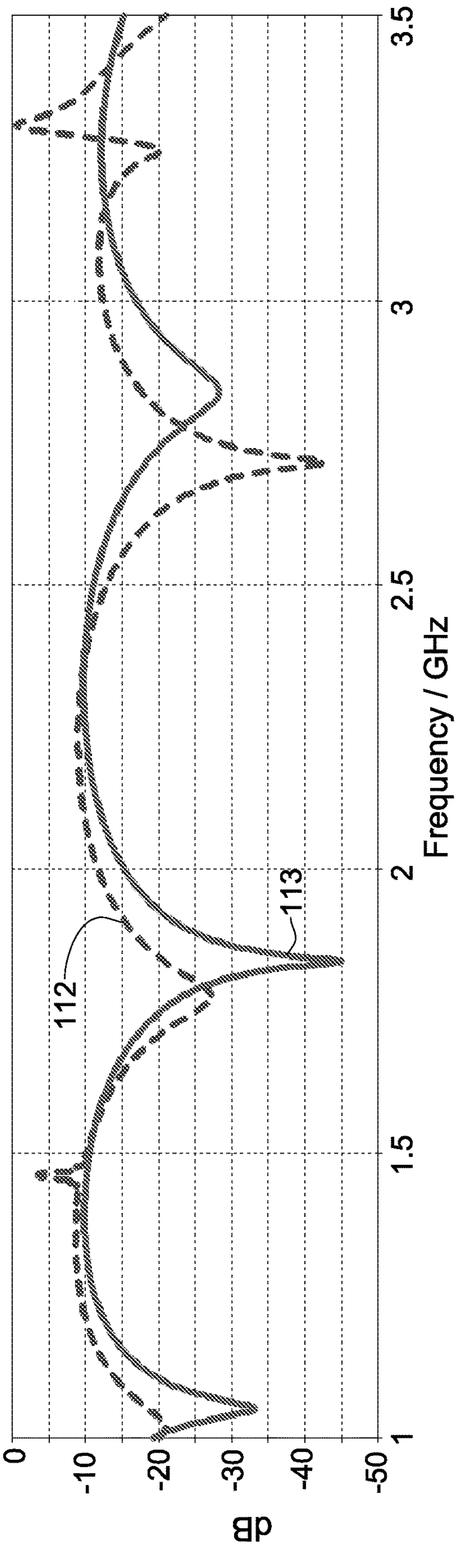
FIG. 5 illustrates an example of frequency dependence of the return loss coefficient of a phased array system built from the end-fire tapered slot antennas having two types of slot lines, such as a tapered slot line and a non-tapered slot line.

FIG. 5 illustrates exemplary frequency dependencies of the return loss coefficient of the phased array system built from the antenna elements having two types of slot lines, such as a tapered slot line and a slot line formed by parallel inner edges of the legs, i.e., the slot line, which is not tapered. In these examples, the substrates in both phased array systems have the thickness $s=0.024\lambda_0$ and the dielectric constant ε=9.2. In particular, a curve 112 describes the frequency dependence of the return loss coefficient for the phased array system built from the antenna elements having a non-tapered slot line. In turn, a curve 113 describes the frequency dependency of the return loss coefficient for the phased array system built from the antenna elements of the present invention (10 in FIG. 1) having the tapered slot line having a profile characterized by a distance between the inner edges of the legs described by the relationship D=0.035x+0.0034.

As can be seen, the phased array system built from the antenna elements having a tapered slot line provides significantly smaller return losses (see curve 112) with respect to the phased array system built from the antenna elements having a non-tapered slot line (see curve 113).

Figure 6:
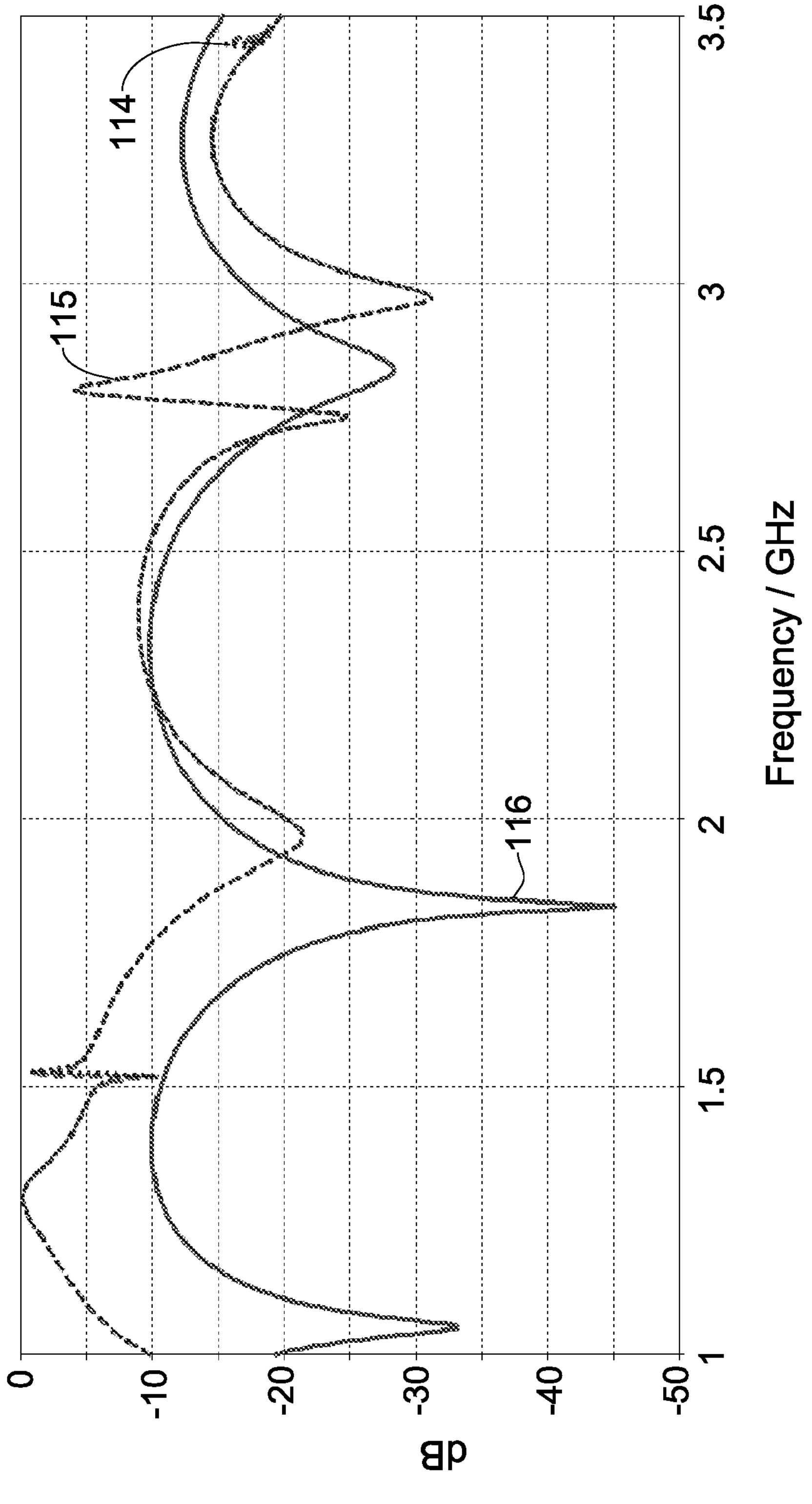
FIG. 6 illustrates an example of frequency dependencies of the return loss coefficient of the phased array system built from the end-fire tapered slot antennas having various vias elements arrangements.

FIG. 6 illustrates exemplary frequency dependencies of the return loss coefficient of the phased array system built from the antenna elements having various vias elements arrangements. In this example, the antenna elements in the phased array system have the slot line characterized by a distance between the inner edges of the legs described by the relationship $D=0.035x+0.003\lambda_0$. Each antenna element includes the substrate having the dielectric constant $\varepsilon=9.2$ and thickness $s=0.024\lambda_0$. In particular, a curve 114 describes the frequency dependency of the return loss coefficient for the phased array system built from the antenna elements having vias elements arranged only along the entire perimeter of the radiating wings. A curve 115 describes the frequency dependency of the return loss coefficient for the phased array system built from the antenna elements having vias elements arranged only along the inner edges of the legs.

As can be seen in FIG. 6, the curves 114 and 115 are very close to each other. In other words, a phased array system built from antenna elements having vias elements arranged only along the entire perimeter of the radiating wings, and a phased array system built from antenna elements having vias elements arranged only along the inner edges of the legs, provide almost the same return losses over the operational frequency range (1 GHz to 3.5 GHz).

On the other hand, a curve 116 describes the frequency dependency of the return loss coefficient for the phased array system built from the antenna elements shown in FIG. 1, which includes vias elements arranged both along the perimeter of radiating wings and the inner edges of the legs, as shown in FIG. 1. As can be seen from the curve 116, the phased array system built from the antenna elements having vias elements arranged on the radiating wings and on the legs, as shown in FIG. 1, provides the optimal (i.e., minimal) return losses.

The end-fire tapered slot antenna of the present invention can be operative with communication devices (e.g., mobile phones, personal digital assistants (PDAs), remote control units, telecommunication with satellites, etc.), radars, telemetry stations, jamming stations, etc.

The end-fire tapered slot antenna of the present invention may also be utilized in various inter-systems, e.g., in communication within computer wireless LAN (Local Area Network), PCN (Personal Communication Network) and ISM (Industrial, Scientific, Medical Network) systems.

The end-fire tapered slot antenna may also be utilized in communications between the LAN and cellular phone network, GPS (Global Positioning System) or GSM (Global System for Mobile communication).

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

It is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims.

Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. An end-fire tapered slot antenna, the end-fire tapered slot antenna comprising:

a conductive ground plane including a pass-through opening recessed therein, the pass-through opening having a predetermined dimension and shape;

a dual tapered slot element (DTSE) passing through the pass-through opening recessed in the conductive ground plane, the DTSE comprising:

a substrate having two surfaces on opposite sides of the substrate, the substrate being made of a nonconductive material;

a radiating portion comprising a first pair of radiating wings symmetrically arranged on the surface located on one side of the substrate, and a second pair of radiating wings symmetrically arranged on the surface, located on another side of the substrate, opposite to the first pair of radiating wings, the radiating wings having flared inner edges, flared lower edges and outer edges orthogonal to the conductive ground plane;

a base portion electrically coupled to the radiating portion, the base portion comprising:

a first pair of legs arranged on one surface of the substrate symmetrically with respect to a symmetry axis orthogonal to the conductive ground plane, and a second pair of legs symmetrically arranged on another surface of the substrate opposite to the first pair of legs, the first and second pairs of the legs passing through the pass-through opening of the conductive ground plane and being coupled to a feed line at a downmost part of the base portion on one of the surfaces, the legs of the first and second pairs having inner edges defining a corresponding slot line therebetween on each side of the substrate along the symmetry axis being orthogonal to said conductive ground plane, the slot line on each side of the substrate having a tapered shape and extending from a downmost part of the base portion towards the radiating portion gradually increasing a distance between the inner edges of the legs in accordance with a predetermined relationship; and a plurality of vias elements arranged only at the inner edges of the legs, and at the flared inner edges, flared lower edges and outer edges of the radiating wings in a spaced-apart relationship along an entire perimeter of the radiating wings, the vias elements electrically connecting the radiating wings and the legs arranged on the surfaces of the opposite sides of the substrate, correspondingly.

2. The end-fire tapered slot antenna of claim 1, wherein said substrate has a dielectric constant in the range of 2 to 20 and a thickness in the range of $0.135\lambda_0$ to $0.3\lambda_0$.

3. The end-fire tapered slot antenna of claim 1, wherein the shape of the pass-through opening is a circular shape having a predetermined diameter in the range of $0.1\lambda_0$ to $0.2\lambda_0$.

4. The end-fire tapered slot antenna of claim 1, wherein the flared inner edges and flared lower edges of the radiating wings flare in an exponential manner.

5. The end-fire tapered slot antenna of claim 1, wherein the flared inner edges of the radiating wings define a radiating gap on each side of the substrate, the radiating gap extending from a downmost part of the radiating portion to the distal uppermost part of the radiating portion.

6. The end-fire tapered slot antenna of claim 5, wherein the radiating gap on each side of the substrate progressively widens in an exponential manner from the downmost part towards the distal uppermost part.

7. The end-fire tapered slot antenna of claim 5, wherein the radiating gap on each side of the substrate is configured to provide an impedance matching between the end-fire tapered slot antenna and a wave impedance in a free-space.

8. The end-fire tapered slot antenna of claim 1, wherein the radiating wings have a predetermined length in the range of $0.35\lambda_0$ to $0.45\lambda_0$, where $\lambda_0$ is a free-space operating wavelength of the end-fire tapered slot antenna.

9. The end-fire tapered slot antenna of claim 8, wherein the legs have a predetermined length in the range of $0.15\lambda_0$ to $0.25\lambda_0$.

10. The end-fire tapered slot antenna of claim 8, wherein the conductive ground plane (11) is disposed at a predetermined distance L from the radiation portion (17), the distance L being in the range of $0.025\lambda_0$ to $0.035\lambda_0$.

11. The end-fire tapered slot antenna of claim 1, wherein the legs have bottom edges and outer edges, the outer edges flaring in an exponential manner.

12. The end-fire tapered slot antenna of claim 1, wherein the slot line on each side of the substrate at the downmost part of the base portion has a distance Do between the inner edges of the legs suitable to match an impedance of the slot line on each side of the substrate with an input impedance of the feed line.

13. The end-fire tapered slot antenna of claim 1, wherein the predetermined relationship describing the gradual increase of the distance between the inner edges of the legs and the symmetry axis is $D=ax+D_0$, where a is taper slope of the inner edges of the slot line along the symmetry axis, x is a coordinate along the symmetry axis and $D_0$ is the distance between the inner edges of the first and second pair of legs and the symmetry axis at the downmost part of the base portion.

14. The end-fire tapered slot antenna of claim 13, wherein the taper slope of the slot line depends on the dielectric constant $\varepsilon$ and the thickness s of the substrate.

15. The end-fire tapered slot antenna of claim 1, wherein said at least one pair of electrical shunts located on each surface of the substrate connects any two points selected on the flared lower edges of the wings to any two corresponding points selected on the ground plane.

16. The end-fire tapered slot antenna of claim 1, wherein the feed line is coupled to the base portion on one of the surfaces, the feed line including a coaxial cable having a shield conductor coupled to one of the legs located on one of the surfaces, and a core conductor connected to the other leg.

17. The end-fire tapered slot antenna of claim 1, wherein the plurality of vias elements are arranged at a predetermined distance d from the inner edges of the legs along the inner edges, and from the flared inner edges, the flared lower edges and the outer edges of the radiating wings being along an entire perimeter of the radiating wings.

18. The end-fire tapered slot antenna of claim 17, wherein the predetermined distance d is in the range of $0.012\lambda_o$ to $0.15\lambda_o$.

19. The phased array system including a plurality of the end-fire tapered slot antennas of claim 1.

20. The phased-array system of claim 19, wherein each end-fire tapered slot antenna of the phased-array system includes vias elements arranged both along inner edges of legs and along a perimeter of radiating wings, whereby undesired longitudinal surface-current modes are suppressed and cross-polarization of the array beam is reduced when the beam is steered to wide scan angles.

21. The phased-array system of claim 19, wherein each end-fire tapered slot antenna further comprises at least one pair of electrical shunts symmetrically positioned on opposite sides of a radiating portion with respect to a symmetry axis and connecting the radiating wings of the DTSE to the conductive ground plane, thereby to provide a balanced connection between the dual tapered slot element and the conductive ground plane, and to equalize surface current distribution across adjacent antenna elements and thereby reduce mutual coupling and cross-polarization within the array aperture.

22. The end-fire tapered slot antenna of claim 1, further comprising at least one pair of electrical shunts located on each surface of the substrate, and configured for connecting the radiating wings of the DTSE to the conductive ground plane, thereby providing a balanced connection between the dual tapered slot element and the conductive ground plane.

23. The end-fire tapered slot antenna of claim 1, wherein said plurality of vias elements are formed as conductive pins extending through the substrate from one surface to the opposite surface to provide electrical interconnection between the radiating wings and the corresponding wings on the opposite side of the substrate.

24. The end-fire tapered slot antenna of claim 1, wherein said conductive ground plane is oriented substantially perpendicular to the symmetry axis of the dual tapered slot element, and disposed at a distance from the radiating portion selected to optimize impedance matching between the antenna and free space.

25. The end-fire tapered slot antenna of claim 1, wherein said feed line comprises a coaxial cable having a shield conductor coupled to one of the legs at a feed point on a bottom edge, and a core conductor coupled to the other leg at a connecting point on an inner edge, the feed point and connecting point being positioned to provide substantially 50-ohm impedance matching at the antenna input.

* * * * *